The present invention relates to room-temperature curable silicone compositions possessing rapid deep-section cure. The silicone sealant compositions of the present invention find application in insulating glass units as elements of windows, skylights, doors and related products.

(12) United States Patent
Ramakrishnan et al.

(10) Patent No.: US 8,217,107 B2
(45) Date of Patent: *Jul. 10, 2012

(54) RAPID DEEP-SECTION CURE SILICONE COMPOSITIONS

(75) Inventors: Indumathi Ramakrishnan, Bangalore (IN); Edward Joseph Nesakumar, Bangalore (IN)

(73) Assignee: Momentive Performance Materials Inc., Albany, NY (US)

( * ) Notice: Subject to any disclaimer, the term of this patent is extended or adjusted under 35 U.S.C. 154(b) by 492 days.

This patent is subject to a terminal disclaimer.

(21) Appl. No.: 11/728,904

(22) Filed: Mar. 27, 2007

(65) Prior Publication Data

US 2008/0242763 A1    Oct. 2, 2008

(51) Int. Cl.
*C08L 83/04* (2006.01)
*C08K 3/18* (2006.01)

(52) U.S. Cl. ........ 524/432; 524/430; 524/445; 524/447; 524/448; 524/449; 525/477; 528/17; 528/18; 528/34; 528/39

(58) Field of Classification Search .............. 523/122
See application file for complete search history.

(56) References Cited

U.S. PATENT DOCUMENTS

| | | | |
|---|---|---|---|
| 4,435,536 A | 3/1984 | Kato et al. | |
| 4,559,319 A * | 12/1985 | Kurita et al. | 502/156 |
| 5,292,606 A | 3/1994 | Fitzgerald | |
| 5,733,960 A | 3/1998 | Altes et al. | |
| 5,786,414 A * | 7/1998 | Chikuni et al. | 524/413 |
| 5,973,023 A * | 10/1999 | Altes et al. | 523/122 |
| 6,258,878 B1 | 7/2001 | Bahadur et al. | |
| 6,710,119 B2 * | 3/2004 | Kimura et al. | 524/588 |

FOREIGN PATENT DOCUMENTS

| | | |
|---|---|---|
| EP | 0558044 | 9/1993 |
| EP | 0799859 | 10/1997 |
| EP | 1209201 | 5/2002 |
| EP | 1209201 A1 * | 5/2002 |
| EP | 1258508 | 11/2002 |
| EP | 1258508 A2 * | 11/2002 |

OTHER PUBLICATIONS

"Handbook of Fillers—A Definitive User's Guide and Databook, 2nd Edition" edited by Wypych and published by Chem-Tec Publishing (1999), p. 246.*
"Handbook of Fillers, Extenders, and Diluents, 2nd Edition" compiled by Ash and published by Synapse Information Resources (2007), p. 414-419.*

* cited by examiner

*Primary Examiner* — Marc Zimmer
(74) *Attorney, Agent, or Firm* — Dominick G. Vicari

(57) ABSTRACT

28 Claims, 3 Drawing Sheets

RAPID DEEP-SECTION CURE SILICONE COMPOSITIONS

FIELD OF THE INVENTION

This invention is generally related to silicone compositions for structural glazing and weatherseal applications. More specifically, this invention relates to silicone rubber compositions possessing rapid deep-section cure.

BACKGROUND OF THE INVENTION

One and two-part, curable silicone compositions are well known in the art. One-part systems generally comprise, inter alia, a silicone polymer having hydrolyzable silyl functionality and a catalyst. Upon exposure to a moist atmosphere, the silyl groups react with water to form silanol groups which, in turn, condense to form a cured siloxane network, the condensation being facilitated by the catalyst. However, silicone polymers systems typically cure slowly, i.e., after a few days to a few weeks of exposure to a moist atmosphere.

Prior art solutions to the undesirably slow deep-section cure rate of silicone and hydrocarbon based compositions include the addition of various catalysts and other ingredients as optional components. For example, U.S. Pat. No. 4,435,536 to Kato et al. discloses one-pack, moisture-curable compositions based on hydrolyzable silyl group containing vinyl polymers wherein the inclusion of a solvent imparts storage stability and "workability" to the compositions. When cured, the compositions are said to have excellent surface hardness and weather resistance. The only specific limitation on the solvent is that it does not lead to precipitation when combined with the vinyl polymer and a curing catalyst and it can, therefore, be a hydrocarbon, alcohol, ketone, ether or ester, inter alia. Preferred solvents include alcohols and hydrolyzable esters, methanol, methyl orthoformate, ethyl orthoformate, methyltrimethoxilane and ethyl silicate being specifically illustrated. However, the systems illustrated appear to be cured at elevated temperatures as thin films and are not shown to provide deep-section cure. Additionally, the solvents illustrated either react into the network, or are too volatile to be retained in the composition as it cures. Furthermore, long-chain alkyl alcohols which are also suggested as solvents would tend to undergo an exchange reaction with the hydrolyzable groups on silicon to effectively cap the polymer with a long-chain alkoxy group which is not readily hydrolyzed, thereby interfering with the intended moisture cure.

Importantly, rapid deep-section cure is often desired in certain sealant and/or adhesive applications (e.g., construction, automotive, and insulating glass applications).

As such, there remains a need within the art for rapid deep-cure moisture-curable silicone compositions that overcome this problem.

SUMMARY OF THE INVENTION

Figure 1:
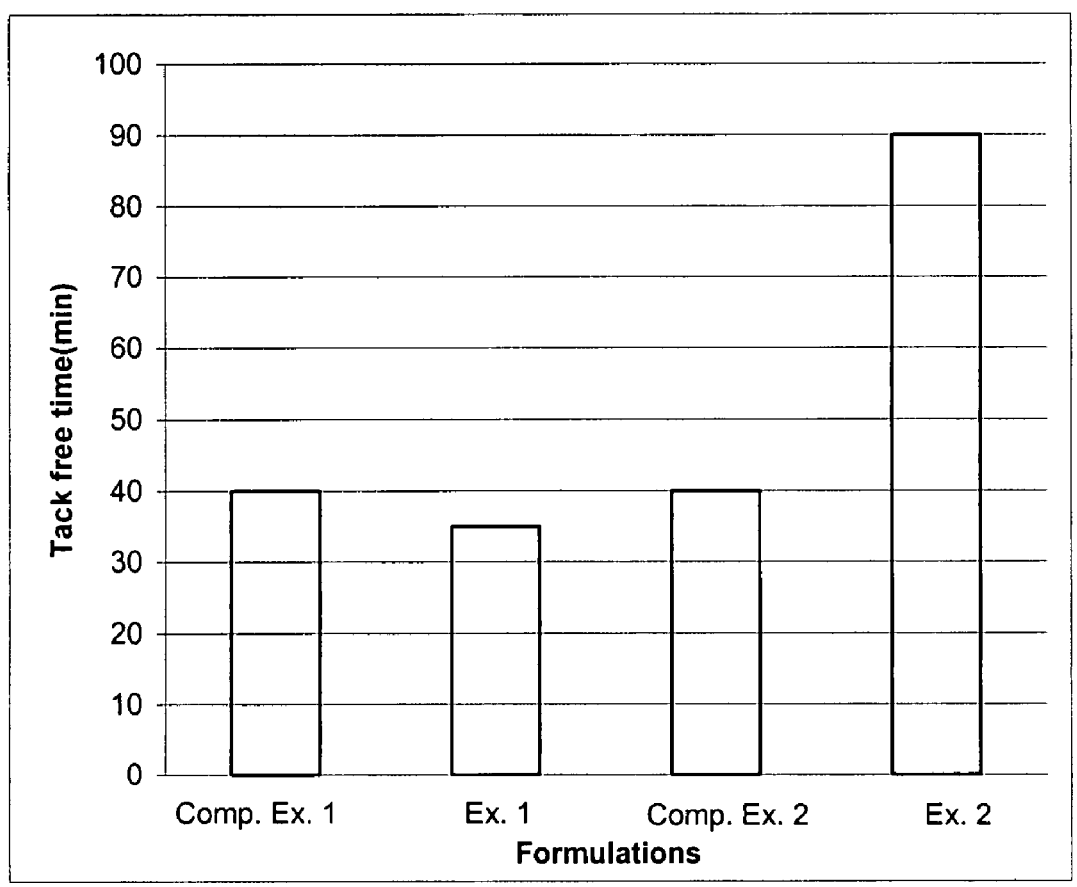
FIG. 1 is a graphical representation of the "tack-free time" of Comparative Examples 1 and 2 and Examples 1 and 2.

The present invention discloses blends of siloxane polymers and zinc oxide and their uses in sealant formulations possessing rapid deep-section cure. More particularly, the present invention provides a curable sealant composition comprising:
a) at least one silanol-terminated diorganopolysiloxane;
b) at least one crosslinker for the silanol-terminated diorganopolysiloxane(s);
c) at least one catalyst for the crosslinking reaction;
d) a rapid deep-section curing amount zinc oxide; and, optionally,
e) at least one additional component selected from the group consisting of alkyl-terminated diorganopolysiloxane, filler, UV stabilizer, antioxidant, adhesion promoter, cure accelerator, thixotropic agent, plasticizer, moisture scavenger, pigment, dye, surfactant, solvent and biocide.

The room-temperature curable one and two part sealant compositions of the present invention inventively provides rapid deep-section cure.

DETAIL DESCRIPTION OF THE INVENTION

The present invention discloses blends of siloxane polymers and zinc oxide and their uses in sealant formulations. The presence of zinc oxide in silicone systems to provide high thermal conductivity and prolonged surface oil on room temperature vulcanizable (RTV) silicone sealant has been reported in U.S. Pat. Nos. 5,292,606 and 5,733,960, respectively.

As understood herein the curing of sealant compositions can be expressed as the "tack-free time" or surface curing and "deep-section cure" or curing along the sealant's thickness. Tack-free time is tested by spreading a sealant to a desired thickness (e.g., 6.35 mm) on a Teflon mold and placing a 10 g stainless steel (SS) weight on the sealant at different intervals of time. The tack free time is the time when no material sticks to the surface of the weight. Alternatively, "deep-section cure" or curing along the thickness is tested based on the spread material being cut along the thickness periodically to detect the complete curing. The time taken for the material to cure completely along the thickness is called deep-section cure, also known as "thick-section cure." Apart from visual observation the inventors have devised a method to measure the deep-section cure, more fully described herein below, by extracting the uncured material of the sealant by solvent.

A general description of each of the components of the deep-section cure sealant composition are given as follows:

The curable composition of the present invention includes at least one silanol-terminated diorganopolysiloxanes (a). Suitable silanol-terminated diorganopolysiloxanes (a) include those of the general formula:

$$M_a D_b D'_c$$

wherein "a" is 2, and "b" is equal to or greater than 1 and "c" is zero or positive; M is

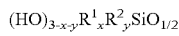
$$(HO)_{3-x-y}R^1_x R^2_y SiO_{1/2}$$

wherein "x" is 0, 1 or 2 and "y" is either 0 or 1, subject to the limitation that x+y is less than or is equal to 2, $R^1$ and $R^2$ each independently is a monovalent hydrocarbon group up to 60 carbon atoms; D is

$$R^3 R^4 SiO_{1/2};$$

wherein $R^3$ and $R^4$ each independently is a monovalent hydrocarbon group up to 60 carbon atoms; and D' is

$$R^5 R^6 SiO_{2/2}$$

wherein $R^5$ and $R^6$ each independently is a monovalent hydrocarbon group up to 60 carbon atoms.

In one embodiment of the invention, the level of incorporation of the diorganopolysiloxane wherein the silicon atom at each polymer chain end is silanol terminated (a) ranges from about 5 weight percent to about 95 weight percent of the total composition. In another embodiment of the invention, the level of incorporation of the diorganopolysiloxane polymer or blends of diorganopolysiloxane polymers (a) ranges from about 20 weight percent to about 85 weight percent of the total composition. In yet another embodiment of the present invention, the diorganopolysiloxane polymer or blends of diorganopolysiloxane polymers (a) ranges from about 30 weight percent to about 60 weight percent of the total composition.

Suitable cross-linkers (b) of the present invention include an alkylsilicate of the general formula:

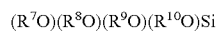

where $R^7$, $R^8$, $R^9$ and $R^{10}$ are independently chosen monovalent $C_1$ to $C_{60}$ hydrocarbon radicals.

Other suitable crosslinkers include, but are not limited to, tetra-N-propylsilicate (NPS), tetraethylortho silicate and methyltrimethoxysilane (MTMS), vinyltrimethoxysilane (VTMS) and similar alkyl substituted alkoxysilane compositions, and the like.

In one embodiment of the present invention, the level of incorporation of the alkylsilicate (crosslinker) ranges from about 0.1 weight percent to about 10 weight percent of the total composition. In another embodiment of the invention, the level of incorporation of the alkylsilicate (crosslinker) ranges from about 0.3 weight percent to about 5 weight percent of the total composition. In yet another embodiment of the present invention, the level of incorporation of the alkylsilicate (crosslinker) ranges from about 0.5 weight percent to about 1.5 weight percent of the total composition.

Suitable catalysts (c) for use herein can be any of those known to be useful for facilitating crosslinking in silicone sealant compositions. The catalyst may include metal and non-metal catalysts. Examples of the metal portion of the metal condensation catalysts useful in the present invention include tin, titanium, zirconium, lead, iron cobalt, antimony, manganese, bismuth and zinc compounds.

According to one embodiment of the present invention, tin compounds useful for facilitating crosslinking in silicone sealant compositions include: tin compounds such as dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, sily-lated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tinbutyrate, and the like.

In one embodiment of the invention, the catalyst for the crosslinking reaction is a metal catalyst. In another embodiment of the invention, the metal catalyst is selected from the group consisting of tin compounds, and in yet another embodiment of the invention, the metal catalyst is solubilized dibutyl tin oxide.

According to another embodiment of the present invention, titanium compounds useful for facilitating crosslinking in silicone sealant compositions include: Di(isopropoxide)Titanium bis(ethylacetoacetate) [Dupont; Tyzor DC]; Di(isobutoxide)Titanium bis(ethylacetoacetato) [Johnson Matthey; Vertec KE6]; Di(n-butoxide)Titanium bis(ethylacetoacetato) [Johnson Matthey]; 1,3-propanedioxytitanium bis(ethylacetoacetate); Titanium(triethanolaminato)isopropoxide [Dupont; Tyzor TE]; Bis(triethanolamino)titanium di(methyl diglycolate) [Sanmar; Isocat ETAM]; Titanium diisopropoxide(bis-2,4-pentanedionate) [Dupont; Tyzor AA]; Titanium ethoxide isopropoxide bis-(2,4-pentanedionate) [Sanmar; Isocat AA 65]; Titanium bis-(2,4-pentanedionate) (2-EHA) [Johnson Matthey; Vertec XL100]; and tetra-alkyl titanates, for example, tetra n-butyl titanate and tetra-isopropyl titanate, and the like.

According to one specific embodiment of the invention, the catalyst for the crosslinking reaction is Di(isopropoxide)Titanium bis(ethylacetoacetate).

In one embodiment of the invention, the level of incorporation of the catalyst ranges from about 0.001 weight percent to about 1 weight percent of the total composition. In another embodiment off the invention, the level of incorporation of the catalyst, ranges from about 0.003 weight percent to about 0.5 weight percent of the total composition. In yet another embodiment of the invention, the level of incorporation of the catalyst, ranges from about 0.005 weight percent to about 0.2 weight percent of the total composition.

The curable sealant composition of the present invention provides room-temperature curable silicone sealant composition, which cures to provide rapid deep-section cure. This rapid deep-section cure is provided by the presence of particulate zinc oxide (d) in the room temperature-curable silicone sealant composition when present in an amount of at least about 1 parts by weight per 100 parts by weight of the total composition of the room-temperature curable silicone sealant composition. In one specific embodiment of the invention, the zinc oxide is present in amounts from about 2 to about 30 parts by weight per 100 parts by weight of the total composition, and in a more specific embodiment from about 5 to about 20 parts by weight per 100 parts by weight of the total composition.

The particulate zinc oxide (d) of the present invention possesses an average particle size of less than about 1 micron, from about 50 to about 70 nm, and a surface area from about 5 to about 30 $m^2/g$. The zinc oxide (d) possesses a purity of from about 80 to about 99.9 percent and a pH that ranges from about 7.0 to about 9.0. The zinc oxide of the present invention is commercially available as White Seal (IP 100) (available from MLA group of Industries, Kanpur, India); Zincosil NK-T-150 (available from MLA group of Industries, Kanpur, India); Zincosil AH-90 (available from MLA group of Industries, Kanpur, India); ACS (available from Aldrich Chemical Co.); Zinc oxide nano powder (available from Aldrich Chemical Co.).

According to a specific embodiment of the invention, the room-temperature curable silicone sealant composition is obtained as a "one-part" composition, wherein all the ingredients are contained in one package and curing occurs upon exposure to atmospheric air.

According to another embodiment of the invention, the room-temperature curable silicone sealant composition is obtained using a "two-part" composition, such compositions are well known in the art. In a two-part system the first part comprises polydiorganosiloxane as described herein, and zinc oxide, and a second part comprises a crosslinker, such as the one described herein above. The second part can also contain filler and a curing catalyst for the room-temperature curable silicone composition. The particulate zinc oxide can be added to either the first or second part. The "parts" of these two-part compositions are stored in separate packages to prevent premature curing which can occur if all the ingredients are mixed for too long a time period before the use of the composition.

Furthermore, the compositions of the present invention can be prepared using either batch or continuous modes of manufacture. Preferably, the ingredients such as silicone polymer, zinc oxide, cure catalyst, crosslinker, adhesion promoter, plasticizers, filler, process aids, and other additives are combined in a continuous compounding extruder to produce the desired sealant composition. Both the "first part" and the "second part" are prepared in this manner. The continuous compounding extruder can be any continuous compounding extruder such as the twin screw Werner-Pfleiderer extruder, or a Buss, or P. B. Kokneader extruder.

In the broadest conception of the present invention, all the ingredients may be mixed in the continuous compounding extruder, that is silicone polymer, zinc oxide, plasticizer, a condensation catalyst and an adhesion promoter, etc. In such a process, which is continuous, the extruder is operated at a range of 20° to 200° C., but more preferably in the range of 25° to 50° C. and the extruder is operated at a partial vacuum so as to remove volatiles during the mixing process.

According to one embodiment of the invention, the silicone compositions of the present invention further comprise an alkoxysilane or blend of alkoxysilanes as an adhesion promoter. In one embodiment, the adhesion promoter may be a combination blend of n-2-aminoethyl-3-aminopropyltrimethoxysilane and 1,3,5-tris(trimethoxysilylpropyl)isocyanurate. Other adhesion promoters useful in the present invention include but are not limited to n-2-aminoethyl-3-aminopropyltriethoxysilane, γ-aminopropyltriethoxysilane, γ-aminopropyltrimethoxysilane, aminopropyltrimethoxysilane, bis-γ-trimethoxysilypropyl)amine, N-Phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl)ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, and n-ethyl-3-trimethoxysilyl-2-methylpropanamine, and the like.

The level of incorporation of the alkoxysilane (adhesion promoter) ranges from about 0.1 weight percent to about 20 weight percent. In one embodiment of the invention, the adhesion promoter ranges from about 0.3 weight percent to about 10 weight percent of the total composition. In another embodiment of the invention, the adhesion promoter ranges from about 0.5 weight percent to about 2 weight percent of the total composition.

In one embodiment of the invention the composition of the present invention includes a plasticizer to reduce the modulus of the cured elastomer. The plasticizer can be polydimethylsiloxane having terminal trioganosiloxy units where the organo groups are methyl, vinyl or phenyl or combinations of these groups. For example, the polydimethylsiloxanes used as plasticizers or modulus reducing agents can normally have a viscosity of from 100 to 100,000 mpa·s measured at 25° C. and can be used in amounts up to 80 parts by weight per 100 parts by weight of the polymeric material.

The silicone composition of the present invention may also comprise a filler. Suitable fillers of the present invention include, but are not limited to, ground, precipitated and colloidal calcium carbonates which is treated with compounds such as stearate or stearic acid, reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black and graphite or clays such as kaolin, bentonite or montmorillonite, talc, mica, and the like.

In one embodiment of the present invention, the filler is a calcium carbonate filler, silica filler or a mixture thereof. In another specific embodiment of the invention, zinc oxide (d) is added directly to the filler. The type and amount of filler added depends upon the desired physical properties for the cured silicone composition. In another embodiment of the invention, the amount of filler is from 0 weight percent to about 90 weight percent of the total composition. In yet another embodiment of the invention, the amount of filler is from about 5 weight percent to about 60 weight percent of the total composition. In still another embodiment of the invention, the amount of filler is from about 10 weight percent to about 40 weight percent of the total composition. The filler may be a single species or a mixture of two or more species.

The compositions of the present invention may optionally comprise non-ionic surfactant compound selected from the group of surfactants consisting of polyethylene glycol, polypropylene glycol, ethoxylated castor oil, oleic acid ethoxylate, alkylphenol ethoxylates, copolymers of ethylene oxide (EO) and propylene oxide (PO) and copolymers of silicones and polyethers (silicone polyether copolymers), copolymers of silicones and copolymers of ethylene oxide and propylene oxide and mixtures thereof in an amount ranging from slightly above 0 weight percent to about 10 weight percent, more preferably from about 0.1 weight percent to about 5 weight percent, and most preferably from about 0.5 weight percent to about 0.75 weight percent of the total composition.

The compositions of the present invention may be prepared using other ingredients that are conventionally employed in room temperature vulcanizing (RTV) silicone compositions such as colorants and pigments as long as they do not interfere with the desired properties.

The rapid deep-section curing silicone sealant compositions of the present invention find numerous uses in applications where rapid deep-section curing is essential. For example, the compositions are used for weather sealing and sealant composition in insulating glass units, or IG units, as elements of windows, skylights, doors and related products, including vehicles. Additional uses of the rapid deep-section curing silicone sealant compositions include conventional curtain wall cladding systems and adjacently jointed window panels, e.g., atrium skylights, glass window walls, and the like. Together with rapid deep-section curing the present compositions provide the necessary flexibility and resiliency, in the desired application, which provides for expansion and contraction due to various conditions, e.g., temperature variations and movement due to building settlement and the like.

The invention is illustrated by the following non-limiting examples:

Preparation of Comparative Example 1 and 2 Sealant Formulations

TABLE 1

| Materials | Amount in grams (g) |
|---|---|
| Silanol (30000 cst) | 34 |
| OMYACARB FT- CaCO₃ | 50 |
| ZnO | 0 |
| Double treated fumed silica | 6 |
| Dimethylpolysiloxane Plasticizer | 10 |

Comparative Examples 1 and 2 were prepared without zinc oxide and consisted of the various ingredients displayed in Table 1. Comparative Example 1 and 2 were prepared the same way in Ross mixer using the following procedure: 34 g of silanol polymer was placed in the Ross mixer and 10 g of plasticizer was placed in a Ross kettle. Heat was applied to 100° C. 20 g of Omya CaCO₃ was slowly added while mixing. 2 g of doubly treated fumed silica was also added. Mixing continued for 15 minutes. The dispersion was checked. Additional 15 g of Omya CaCO₃ was slowly added along with 2 g of doubly treated fumed silica and mixed for 30 minutes. The dispersion was again checked. Another 15 g of Omya CaCO₃ slowly added to the mix, along with 2 more grams of doubly treated fumed silica and mixing continued for 2 hours. The mixture was transferred to an air-tight container.

Curing Procedure: The mixtures were then blended with catalyst, cross-linker and adhesion promoter with quantities and ingredients displayed in Table 2 and Table 3, respectively, and placed in a Hauschild speed mixer and kept for 9-14 days for aging. The mixtures of Comparative Examples 1 and 2 were then removed and poured in Teflon molds with ¼" depth.

Comparative Example 1 was prepared with cross-linker methyl trimethoxy silane (MTMS) and adhesion promoter tris(trimethoxy silyl propyl)isocyanurate (Iso-T) as displayed in Table 2:

TABLE 2

| Comp. Ex. 1 | Silanol + CaCO3 + Plasticizer + Fumed silica | 48.5 g |
|---|---|---|
| Catalyst | Titanium isopropoxide ethylacetylacetonate | 0.5 g |
| Cross-linker | MTMS | 0.9 g |
| Adhesion promoter | Iso-T | 0.2 g |

Comparative Example 2 was prepared exactly as Comparative Example 1 except that cross-linker vinyl trimethoxy silane (VTMS) and adhesion promoter Iso-T were used as displayed in Table 3:

TABLE 3

| Comp. Ex. 2 | Silanol + CaCO3 + Plasticizer + Fumed silica | 48.5 g |
|---|---|---|
| Catalyst | Titanium isopropoxide ethylacetylacetonate | 0.5 g |
| Cross-linker | VTMS | 0.9 g |
| Adhesion promoter | Iso-T | 0.2 g |

Preparation of Example 1 Sealant Formulation

TABLE 4

| Materials | Amount in grams (g) |
|---|---|
| Silanol (30000 cst) | 33 |
| OMYACARB FT- CaCO₃ | 45 |
| ZnO | 5 |
| Double treated fumed silica | 6 |
| Dimethylpolysiloxane Plasticizer | 10 |

Example 1 sealant formulation was prepared with zinc oxide and the various ingredients displayed in Table 4. Example 1 was prepared in Ross mixer using the following procedure: 34 g of silanol polymer was placed in a Ross mixer and 10 g of plasticizer in a Ross kettle. Heat was applied to 100° C. 15 g of Omya CaCO₃, 2 g of doubly treated fumed silica, and 5 g of zinc oxide were slowly added while mixing. Mixing continued for 15 minutes. The dispersion was checked. An additional 15 g of Omya CaCO₃ and 2 g of doubly treated fumed silica were slowly added to the mixture. Mixing proceeded for 30 minutes. The dispersion was checked. Another 15 g of Omya CaCO₃ and 2 g of doubly treated fumed silica were slowly added to the mixture. Mixing continued for 2 hours. The mixture was transferred in an air tight container.

Curing Procedure: The mixture was then blended with catalyst, cross-linker and adhesion promoter with quantities and ingredients displayed in Table 5, in a Hauschild speed mixer and kept for 9-14 days for aging. The mixture was then taken out and poured in a Teflon mold with ¼" depth.

Example 1 was prepared cross-linker MTMS and adhesion promoter Iso-T:

TABLE 5

| Example 1 | Silanol + CaCO3 + Plasticizer + Fumed silica | 48.5 g |
|---|---|---|
| Catalyst | Titanium isopropoxide ethylacetylacetonate | 0.5 g |
| Cross-linker | MTMS | 0.9 g |
| Adhesion promoter | Iso-T | 0.2 g |

The ingredients of Example 2 sealant formulation are displayed in Table 6:

TABLE 6

| Materials | Amount in grams (g) |
|---|---|
| Silanol (30000 cst) | 34 |
| OMYACARB FT- CaCO₃ | 40 |
| ZnO | 10 |
| Double treated fumed silica | 6 |
| Dimethylpolysiloxane Plasticizer | 10 |

Example 2 sealant formulation was prepared with zinc oxide and the various ingredients displayed in Table 6. Example 2 was prepared in Ross mixer using the following procedure: 34 g of Silanol polymer was placed in a Ross mixer and 10 g of plasticizer was placed in a Ross kettle. Heat was applied to 100° C. 15 g of Omya CaCO₃, 2 g of doubly treated fumed silica, and 10 g of zinc oxide were slowly added while mixing. Mixing continued for 15 minutes. The dispersion was checked. An additional 10 g of Omya CaCO₃ and 2 g of doubly treated fumed silica were slowly added to the mixture. Mixing proceeded for 30 minutes. The dispersion was checked. Another 15 g of Omya CaCO₃ and 2 g of doubly treated fumed silica were slowly added to the mixture. Mixing continued for 2 hours. The mixture was transferred in an air tight container.

Curing Procedure: The mixture was then blended with catalyst, cross-linker and adhesion promoter with quantities and ingredients displayed in Table 7, in a Hauschild speed mixer and kept for 9-14 days for aging. The mixture was then taken out and poured in a Teflon mold with ¼" depth.

Example 2 was prepared with cross-linker vinyltrimethoxysilane (VTMS) and adhesion promoter Iso-T and the various ingredients of Table 7:

TABLE 7

| Example 2 | Silanol + CaCO3 + Plasticizer + Fumed silica | 48.5 g |
|---|---|---|
| Catalyst | Titanium isopropoxide ethylacetylacetonate | 0.5 g |
| Cross-linker | VTMS | 0.9 g |
| Adhesion promoter | Iso-T | 0.2 g |

Tack Free Time and Deep Section Cure measurements: After applying Examples 1-2 and Comparative Examples 1-2 in Teflon molds with "4" thickness, the surface was made even with an aluminum spacer. Beginning at the time the material was first applied, the surface was checked with a 10 g weight to determine if the material is tack free at 15 minute intervals (minimum) until it is found to be tack-free. Tack free time data of Examples 1-2 and Comparative Examples 1-2 is presented in FIG. 1.

Deep-section cure was determined by solvent swelling experiments as follows: A weighed portion of the resin in accordance with Examples 1-2 and Comparative Examples 1-2 was obtained from a cut along the thickness of the mold (a sample of about 5 grams from each of Examples 1-2 and Comparative Examples 1-2 was obtained) and allowed to swell in 100 ml of toluene for 3 days. The samples from Example 1-2 and Comparative Examples 1-2 were removed from the toluene and kept for drying under ambient conditions for 3 days. Each sample was weighed again after drying. The difference in weight provides the amount of uncured sample from Example 1-2 and Comparative Examples 1-2 dissolved in toluene. This measurement was obtained at the $6^{th}$, $24^{th}$ and $48^{th}$ hour after applying the sealant examples in the Teflon mold. The percentage of uncured example was plotted against time.

Figure 2:
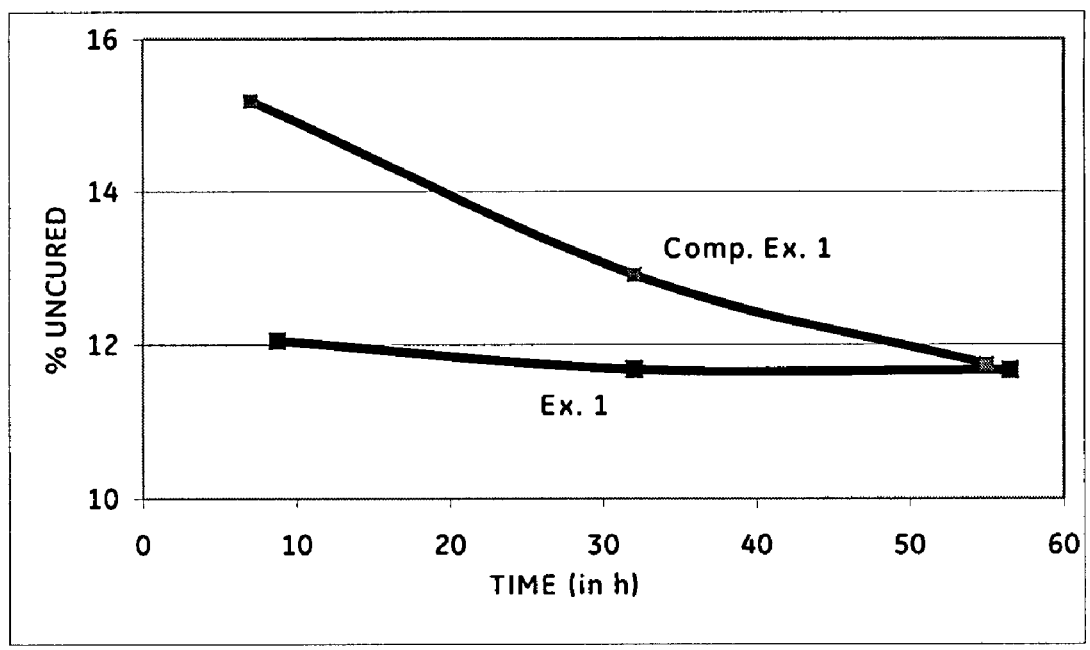
FIG. 2 is a graphical representation of the "deep-section cure" rates of Example 1 and Comparative Example 1.
Figure 3:
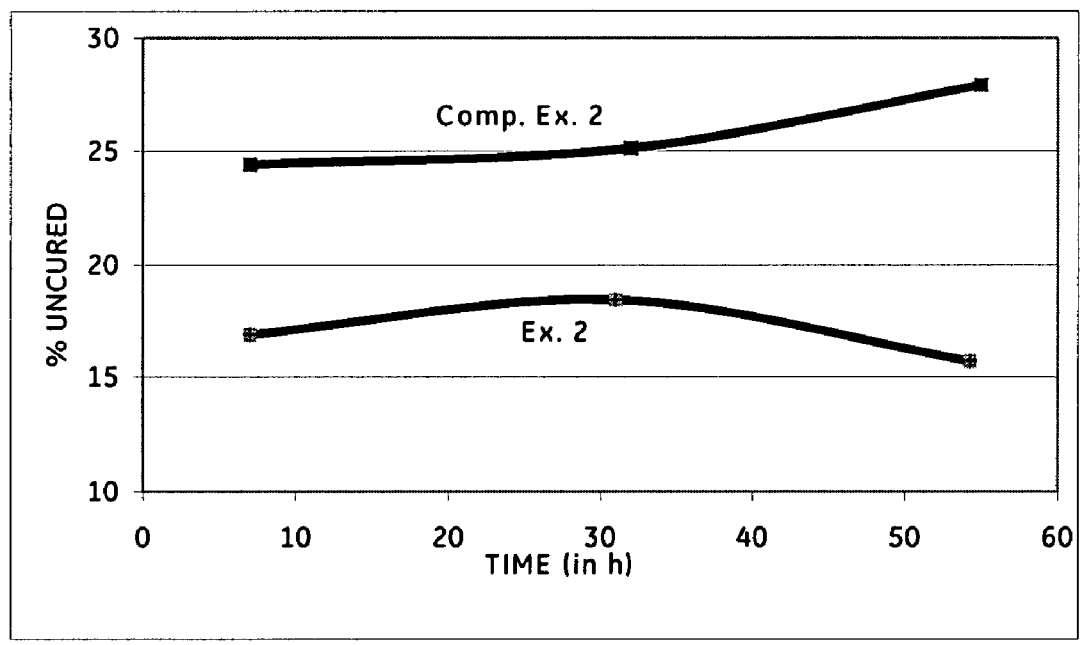
FIG. 3 is a graphical representation of the "deep-section cure" rates of Example 2 and Comparative Example 2.

Deep-section cure data for Comparative Example 1 and Example 1 are presented in FIG. 2, and deep-section cure data for Comparative Example 2 and Example 2 are presented in FIG. 3.

While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

What is claimed is:
1. A curable sealant composition comprising:
   a) at least one silanol-terminated diorganopolysiloxane;
   b) at least one crosslinker for the silanol-terminated diorganopolysiloxane(s) selected from the group consisting of cross-linkers possessing the general formula:

$(R^7O)(R^8O)(R^9O)(R^{10}O)Si$ where $R^7$, $R^8$, $R^9$ and $R^{10}$ are independently chosen monovalent $C_1$ to $C_{60}$ hydrocarbon radicals and methyltrimethoxysilane;
   c) at least one catalyst for the crosslinking reaction;
   d) a rapid deep-section curing amount of zinc oxide having an average particle size of from about 50 nm to about 70 nm and possessing a surface area of from about 5 to 30 $m^2$/gram;
   e) at least one additional component selected from the group consisting of alkyl-terminated diorganopolysiloxane, filler, UV stabilizer, antioxidant, adhesion promoter, cure accelerator, thixotropic agent, plasticizer, moisture scavenger, pigment, dye, surfactant, solvent and biocide; and,
   wherein the composition when cured achieves a level of deep-section cure in 24 hours which is at least 7 percent greater and a level of cure in 48 hours which is at least 10 percent greater than an equivalent composition cured over the same period in the absence of zinc oxide.

2. The curable sealant composition of claim 1 wherein the diorganopolysiloxane polymer, component (a), is a silanol terminated diorganopolysiloxane having the formula:

$M_a D_b D'_c$ wherein a=2, b is equal to or greater than 1, c is zero or a positive integer;

$M=(HO)_{3-x-y}R^1_x R^2_y SiO_{1/2};$ wherein x=0, 1 or 2 and y is either 0 or 1, with the proviso that x+y is less than or equal to 2, $R^1$ and $R^2$ are monovalent C1 to C60 hydrocarbon radicals;

$D=R^3 R^4 SiO_{1/2};$ wherein $R^3$ and $R^4$ are monovalent C1 to C60 hydrocarbon radicals; and $D'=R^5 R^6 SiO_{2/2};$ wherein $R^5$ and $R^6$ are independently chosen monovalent C1 to C60 hydrocarbon radicals.

3. The curable sealant composition of claim 1 wherein the crosslinker, component (b), is at least one selected from the group consisting of tetra-N-propylsilicate, and tetraethylortho silicate.

4. The curable sealant composition of claim 1 wherein the catalyst, component (c), is a tin catalyst.

5. The curable sealant composition of claim 4 wherein the tin catalyst is at least one selected from the group consisting of dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, and diorganotin bis β-diketonates.

6. The curable sealant composition of claim 1 wherein the catalyst, component (c), is a titanium compound.

7. The curable sealant composition of claim 6 wherein the titanium compound is at least one selected from the group consisting of Di(isopropoxide) Titanium bis(ethylacetoacetate), Di(isobutoxide) Titanium bis(ethylacetoacetato), Di(n-butoxide) Titanium bis(ethylacetoacetato), 1,3-propanedioxytitanium bis(ethylacetoacetate), Titanium (triethanolaminato)isopropoxide, Bis(triethanolamino) titanium di(methyl diglycolate), Titanium diisopropoxide (bis-2,4- pentanedionate), Titanium ethoxide isopropoxide bis-(2,4-pentanedionate), Titanium bis-(2,4-pentanedionate) (2-EHA), tetra n-butyl titanate, and tetra-isopropyl titanate.

8. The curable sealant composition of claim 7 wherein the titanium compound is Di(isopropoxide) Titanium bis(ethylacetoacetate).

9. The curable sealant composition of claim 1 wherein the adhesion promoter is selected from the group consisting of n-2-aminoethyl-3-aminopropyltrimethoxysilane, 1,3,5-tris (trimethoxysilylpropyl)isocyanurate, γ-aminopropyltriethoxysilane, γ-aminopropyltrimethoxysilane, aminopropyltrimethoxysilane, bis-γ-trimethoxysilypropyl)amine, N-Phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl) propyltrimethoxysilane, β-(3,4-epoxycyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, n-ethyl-3-trimethoxysilyl-2-methylpropanamine, and mixtures thereof.

10. The curable sealant composition of claim 1 wherein the optional filler is selected from the group consisting of clays, nano-clays, organo-clays, ground calcium carbonate, precipitated calcium carbonate, colloidal calcium carbonate, calcium carbonate treated with compounds stearate or stearic acid; fumed silica, precipitated silica, silica gels, hydrophobized silicas, hydrophilic silica gels, crushed quartz, ground quartz, alumina, aluminum hydroxide, titanium hydroxide, clay, kaolin, bentonite montmorillonite, diatomaceous earth, iron oxide, carbon black and graphite, talc, mica, and mixtures thereof.

11. The curable sealant composition of claim 1 comprising a non-ionic surfactant selected from the group consisting of polyethylene glycol, polypropylene glycol, ethoxylated castor oil, oleic acid ethoxylate, alkylphenol ethoxylates, copolymers of ethylene oxide and propylene oxide, and mixtures thereof in an amount ranging from about 0.1 weight percent to about 10 weight percent.

12. The curable sealant composition of claim 1 wherein the diorganopolysiloxane polymer, component (a), ranges from in amount from about 5 weight percent to about 95 weight percent of the total composition.

13. The curable sealant composition of claim 1 wherein the diorganopolysiloxane polymer, component (a), ranges from in amount from about 20 weight percent to about 85 weight percent of the total composition.

14. The curable sealant composition of claim 1 wherein the diorganopolysiloxane polymer, component (a), ranges from in amount from about 30 weight percent to about 60 weight percent of the total composition.

15. The curable sealant composition of claim 1 wherein the amount of the cross-linker, component (b), ranges in amount from about 0.1 weight percent to about 10 weight percent of the total composition.

16. The curable sealant composition of claim 1 wherein the amount of the cross-linker, component (b), ranges in amount from about 0.3 weight percent to about 5 weight percent of the total composition.

17. The curable sealant composition of claim 1 wherein the amount of the cross-linker, component (b), ranges in amount from about 0.5 weight percent to about 1.5 weight percent of the total composition.

18. The curable sealant composition of claim 1 wherein the total amount of catalyst, component (c), ranges in amount from about 0.001 weight percent to about 1 weight percent of the total composition.

19. The curable sealant composition of claim 1 wherein the total amount of catalyst, component (c), ranges in amount from about 0.003 weight percent to about 0.5 weight percent of the total composition.

20. The curable sealant composition of claim 1 wherein the total amount of catalyst, component (c), ranges in amount from about 0.005 weight percent to about 0.2 weight percent of the total composition.

21. The curable sealant composition of claim 1 wherein the amount of zinc oxide, component (d), ranges in amount from about 1 to about 60 weight percent of the total composition.

22. The curable sealant composition of claim 1 wherein the amount of zinc oxide, component (d), ranges in amount from about 2 to about 30 weight percent of the total composition.

23. The curable sealant composition of claim 1 wherein the amount of zinc oxide, component (d), ranges in amount from about 5 to about 20 weight percent of the total composition.

24. The curable sealant composition of claim 1 wherein the amount of filler, ranges in amount from 0 to about 90 weight percent of the total composition.

25. The curable sealant composition of claim 1 wherein the amount of adhesion promoter ranges in amount from about 0.5 weight percent to about 20 weight percent of the total composition.

26. The cured composition of claim 1.

27. A cured sealant comprising the curable sealant composition of claim 1.

28. The curable sealant composition of claim 1 wherein the rapid deep-section curing amount of zinc oxide is from about 10 weight percent to about 30 weight percent of the total weight of the composition.

* * * * *